United States Patent
Schmidt

(10) Patent No.: US 7,305,755 B2
(45) Date of Patent: Dec. 11, 2007

(54) PROCESSING TONG

(76) Inventor: Heiko Schmidt, Wiesmeierweg 5, D-93047 Regensburg (DE)

( * ) Notice: Subject to any disclaimer, the term of this patent is extended or adjusted under 35 U.S.C. 154(b) by 548 days.

(21) Appl. No.: 10/776,932

(22) Filed: Feb. 12, 2004

(65) Prior Publication Data

US 2005/0132563 A1   Jun. 23, 2005

(30) Foreign Application Priority Data

Dec. 18, 2003   (DE) .............................. 103 59 879

(51) Int. Cl.
*B23P 21/00* (2006.01)
*B23P 19/02* (2006.01)

(52) U.S. Cl. ............................ 29/715; 29/816; 29/818; 29/243.53; 29/276

(58) Field of Classification Search ................ 29/276, 29/715, 816, 818, 243.5, 243.53, 521, 525.01, 29/525.05, 525.06, 281.1, 283, 283.5
See application file for complete search history.

(56) References Cited

U.S. PATENT DOCUMENTS

| | | | | |
|---|---|---|---|---|
| 2,054,269 A | * | 9/1936 | Reilly | .................... 72/482.91 |
| 2,184,356 A | * | 12/1939 | Lindgren | .................... 100/231 |
| 2,365,147 A | * | 12/1944 | Speller | ........................ 29/715 |
| 3,390,446 A | * | 7/1968 | Ettorre | ........................ 29/252 |
| 4,856,316 A | * | 8/1989 | Slasinski | ...................... 72/451 |
| 5,138,758 A | * | 8/1992 | Gubbiotti et al. | .......... 29/432.2 |
| 5,282,303 A | * | 2/1994 | Schriever | ................... 29/432.1 |
| 6,148,507 A | * | 11/2000 | Swanson et al. | ............. 29/816 |
| 6,442,830 B1 | * | 9/2002 | Vrana | .......................... 29/715 |
| 6,796,020 B2 | * | 9/2004 | Thompson | ................... 29/712 |
| 6,862,793 B2 | * | 3/2005 | Frenken | .................... 29/525.06 |
| 6,951,052 B2 | * | 10/2005 | Clew | ....................... 29/525.06 |
| 6,964,094 B2 | * | 11/2005 | Kondo | ......................... 29/798 |
| 7,100,272 B2 | * | 9/2006 | Thompson | ................... 29/712 |

* cited by examiner

Primary Examiner—Essama Omgba
(74) Attorney, Agent, or Firm—Hoffman, Wasson & Gitler, P.C.

(57) ABSTRACT

A hydraulic processing tong for processing workpieces, with a tool, has a first tool part with an axially movable press ram or plunger, which with a first end or a tool located there and an opposing workpiece assembly forms a work area or work gap and with the first end can move toward and away from the workpiece assembly, and with a hydraulic actuating device for applying a force to the press ram, causing it to move in the direction of the workpiece assembly.

29 Claims, 9 Drawing Sheets

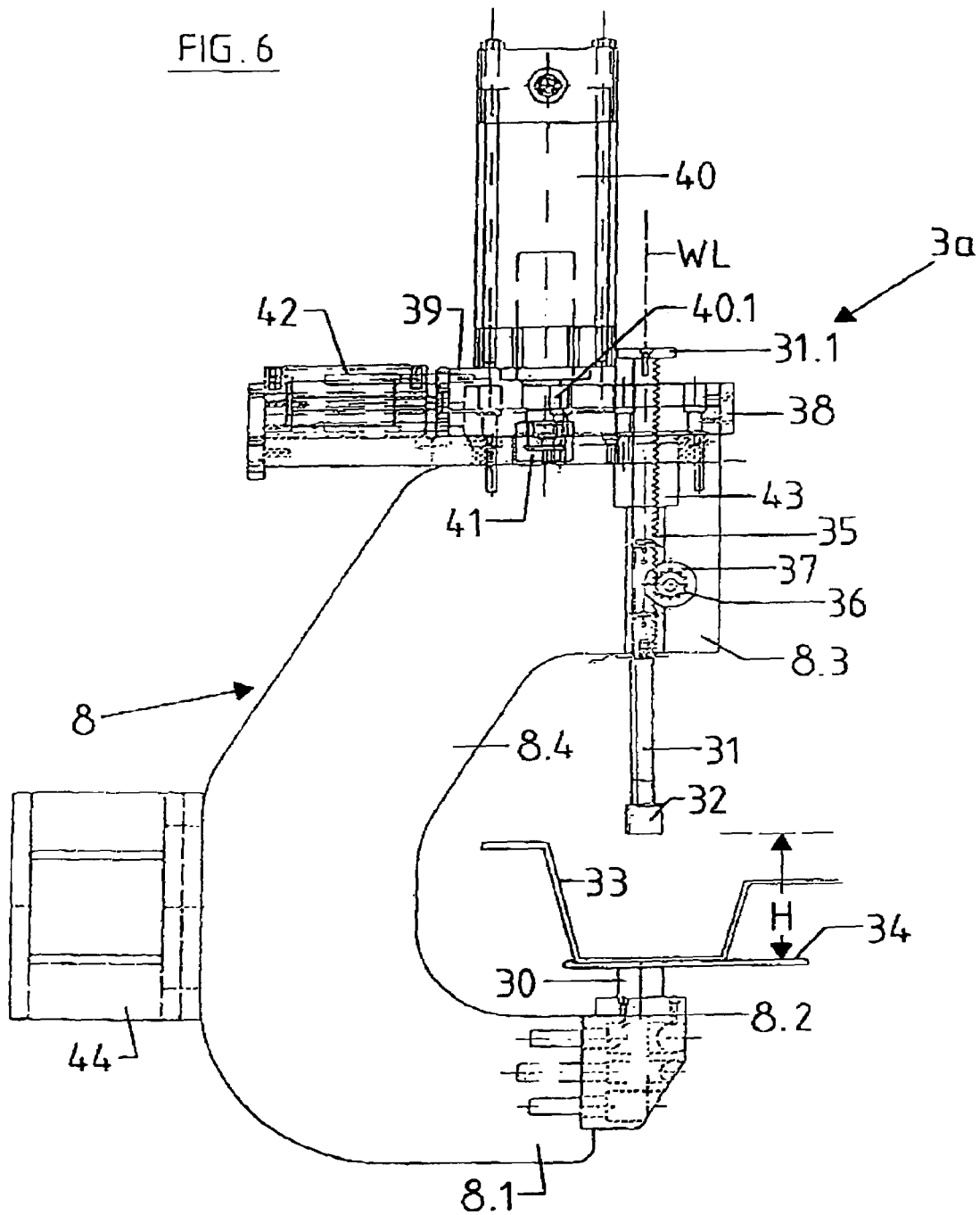

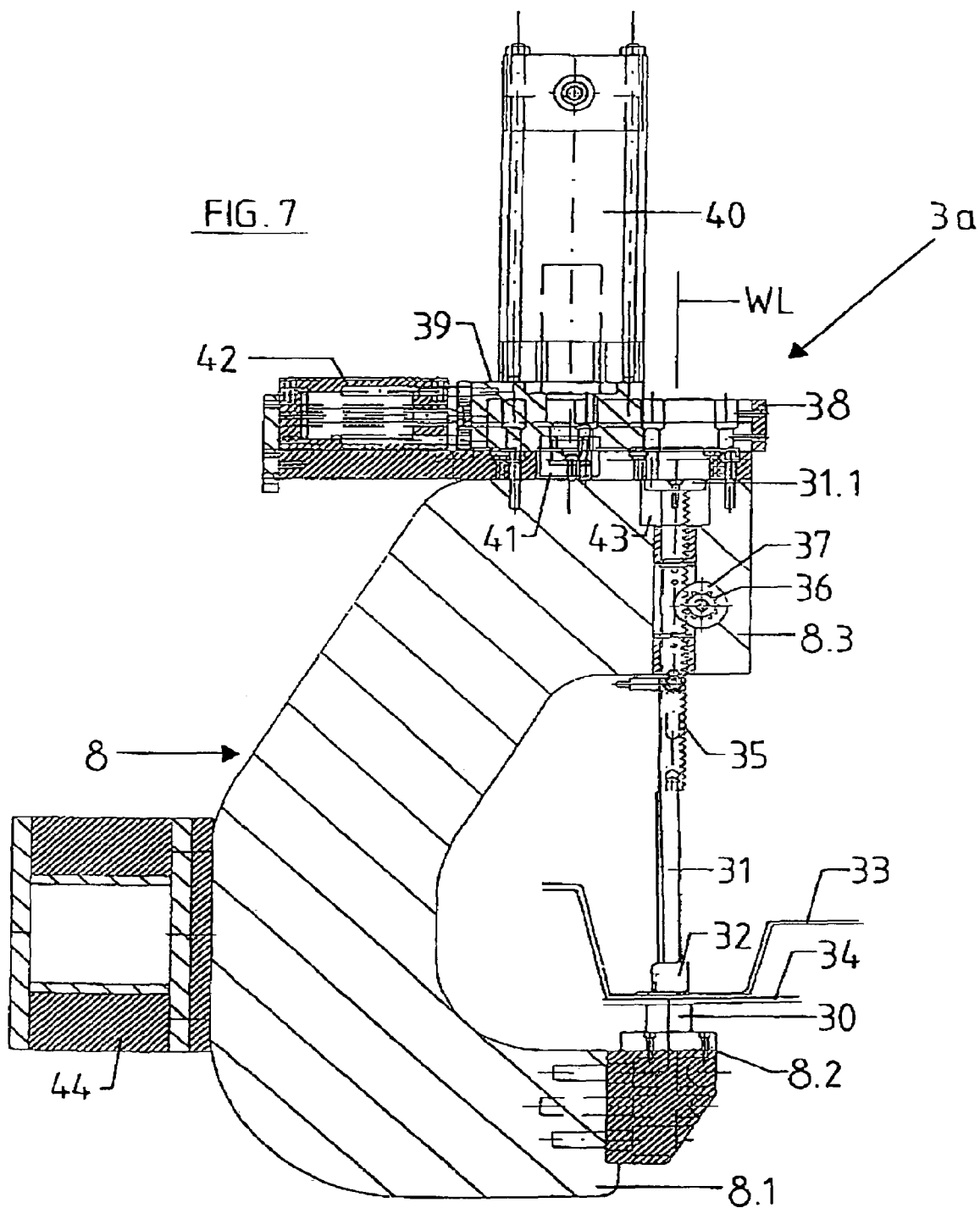

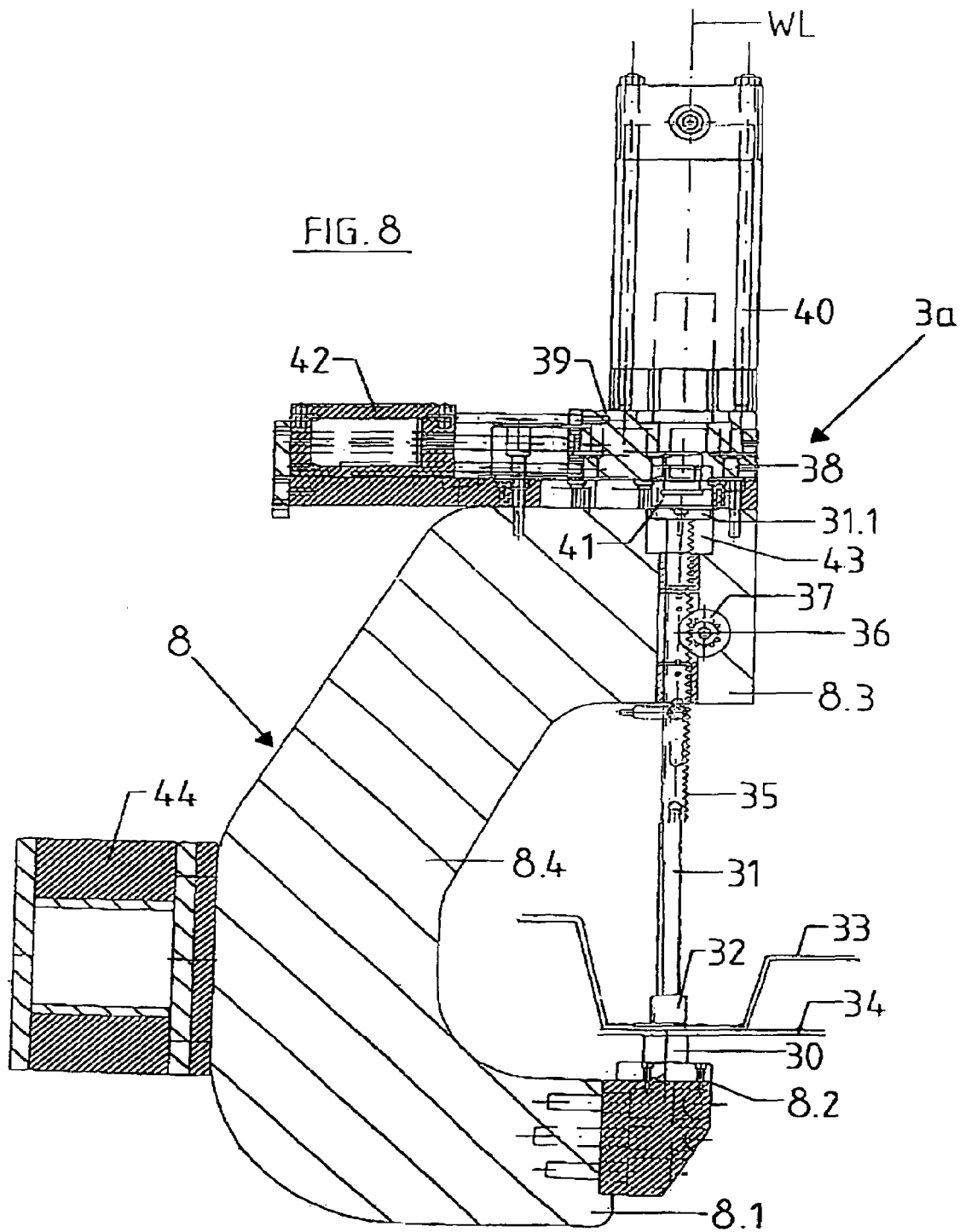

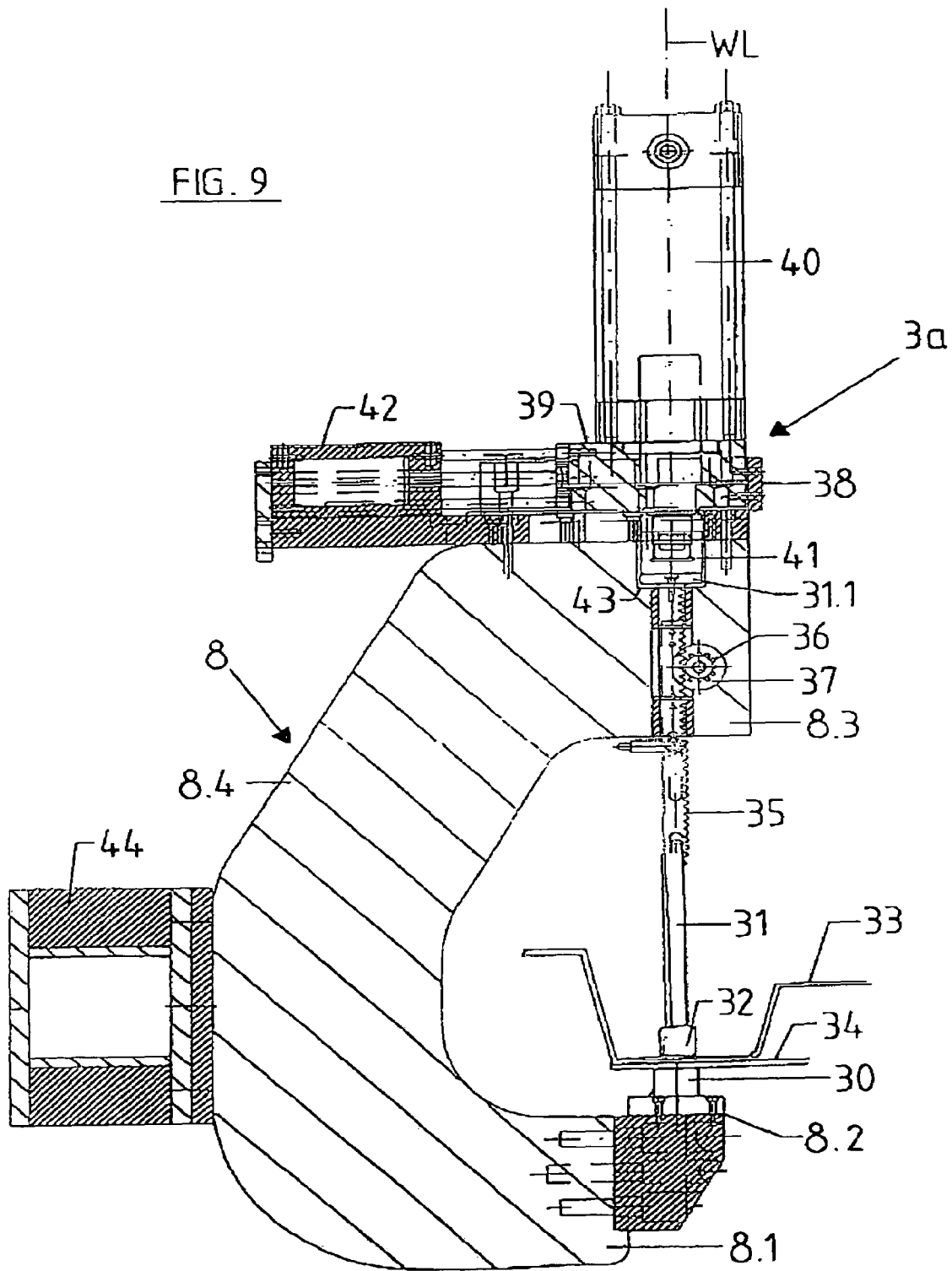

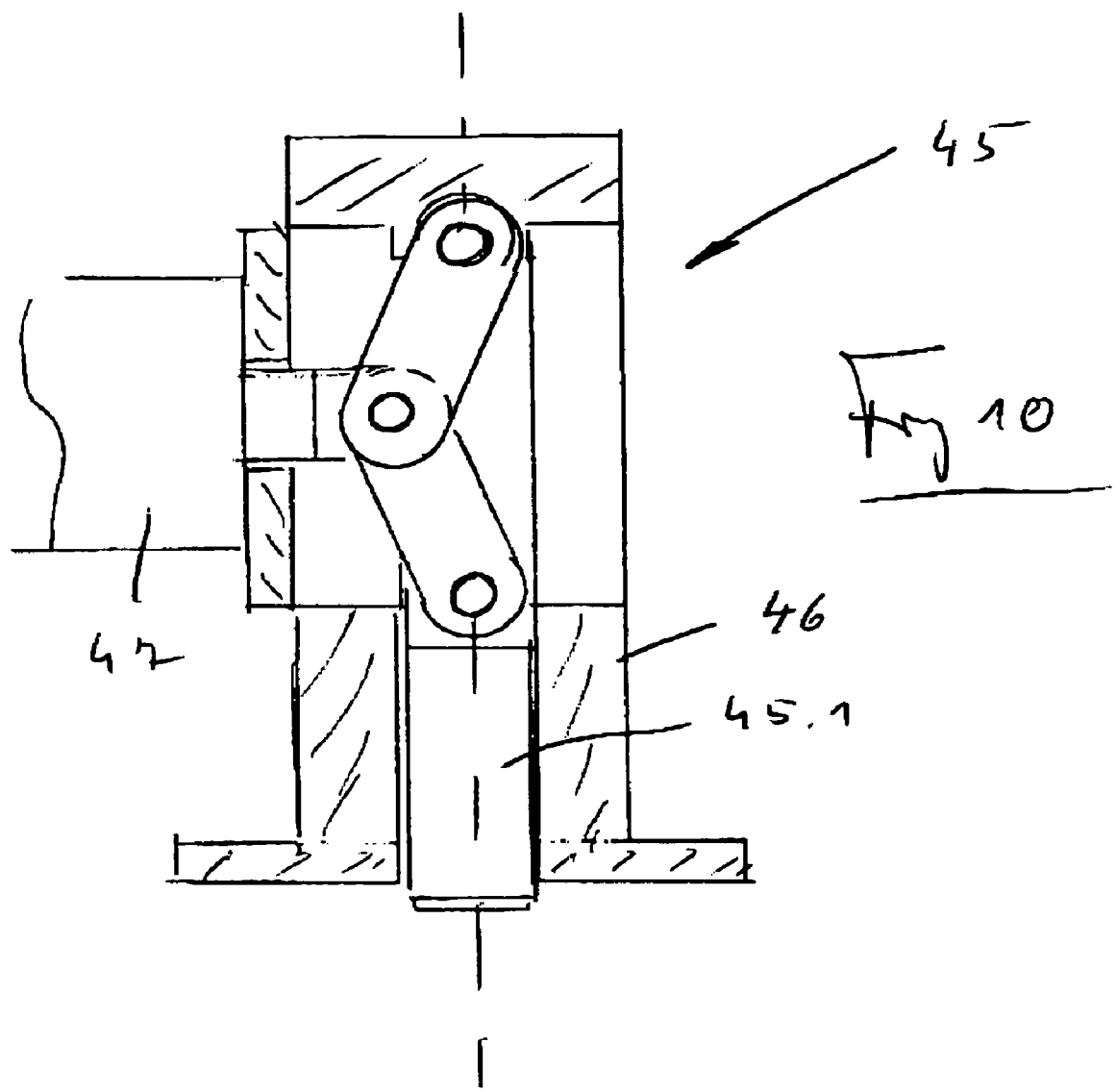

PROCESSING TONG

BACKGROUND OF THE INVENTION

The present invention relates to a hydraulic processing tong, and in particular to a setting tong or setting tong machine for inserting and fixing functional or connecting elements, for example nuts, bolts or similar elements by means of joining and pressing into workpieces, made for example of sheet metal or sheet steel and/or for connecting workpieces, by means of clinching.

An object of the invention is to provide for a processing tong that is characterized by a high safety standard and a small size.

SUMMARY OF THE INVENTION

"Processing tong", according to the invention, generally refers to a device with which workpieces can be processed hydraulically and therefore with a high application of force and which for this processing has at least two elements that can move in relation to each other and form a working gap between them, one of which is a hydraulically actuated press ram or is located on such a ram and the other of which forms a workpiece assembly.

A special feature of the processing tong, according to the present invention, is a stroke reduction for the hydraulic pressure drive or pressure piston, by means of which the high force required for the processing, i.e. for pressing or clinching, is applied to the press ram designed, for example, as a plunger. The stroke reduction is achieved with the invention in that by means of a feed or closing drive first the press ram and preferably also a first tool part, in which this ram can move axially, are advanced so that a working gap is fully or nearly fully closed when a workpiece or workpieces are accommodated in it, i.e. when the processing tong is designed for inserting connecting elements in a workpiece, the ram bears against the respective connecting element and supports itself against the bearing surface or opposite surface bearing against the workpiece. A subsequent slight stroke (continuing stroke) by the hydraulic actuating mechanism or the hydraulic pressure drive then exerts a high force to permanently fix the connecting element in the workpiece by means of pressing.

The feed or closing movement can take place with a low force, so that injuries can be practically eliminated, especially when the processing tong is designed as a manual workplace.

Due to the stroke reduction for the pressure drive or for the pressure piston, the size can be kept very small and compact. The pressure drive is then designed as a slave cylinder of a spatially separated working cylinder, which likewise helps to reduce the size of the processing tong.

BRIEF DESCRIPTION OF THE DRAWINGS

The invention is described below based on the drawings with sample embodiments, as follows:

FIGS. 6-9 depict a processing or setting tong according to a further possible embodiment in various states; and FIG. 10 is a schematic representation of a toggle joint drive.

DETAILED DESCRIPTION OF THE INVENTION

The work station depicted in FIGS. 1-5 is used for the insertion of components, i.e. in the depicted embodiment, of nuts 1 in workpieces made of sheet metal. The work station consists, for this purpose, of a manual workplace consisting of a C-shaped or setting tong 3 and of a hydraulic working cylinder 4 that drives the setting tong 3, and is spatially separate from this tong. The working cylinder 4 and the setting tong 3 or a pressure cylinder 5 located there, are connected with each other by means of a hydraulic pressure line 6.

Figure 2:
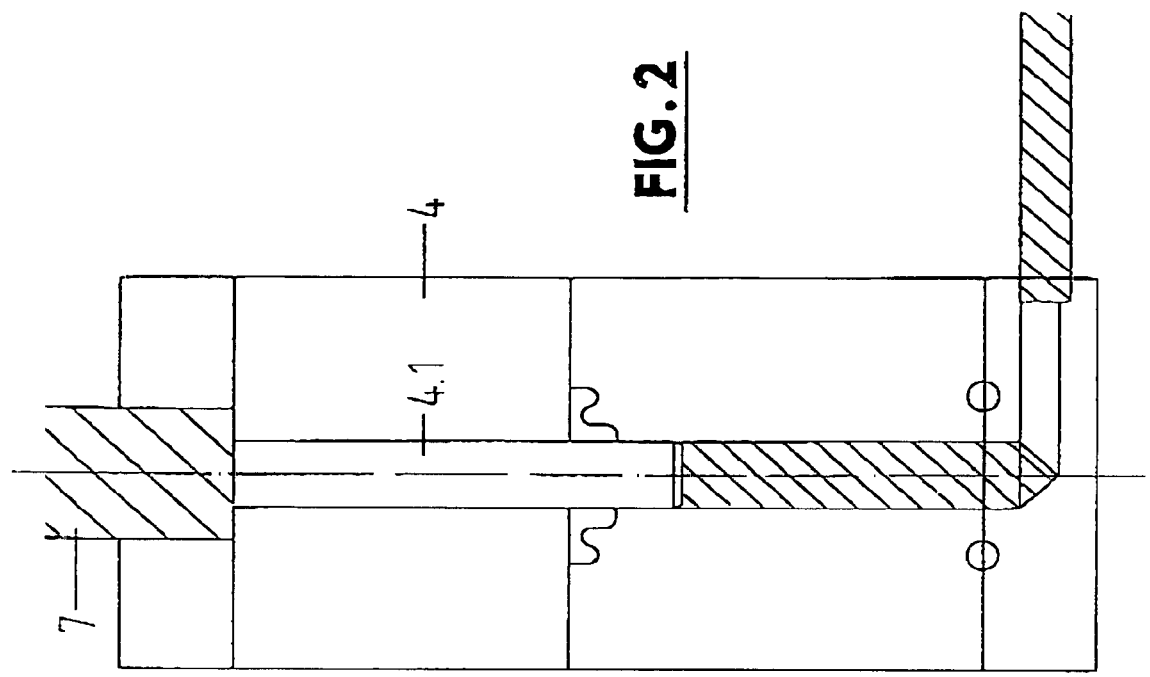
FIG. 2—a schematic representation of the working piston of the work station in FIG. 1.
Figure 1:
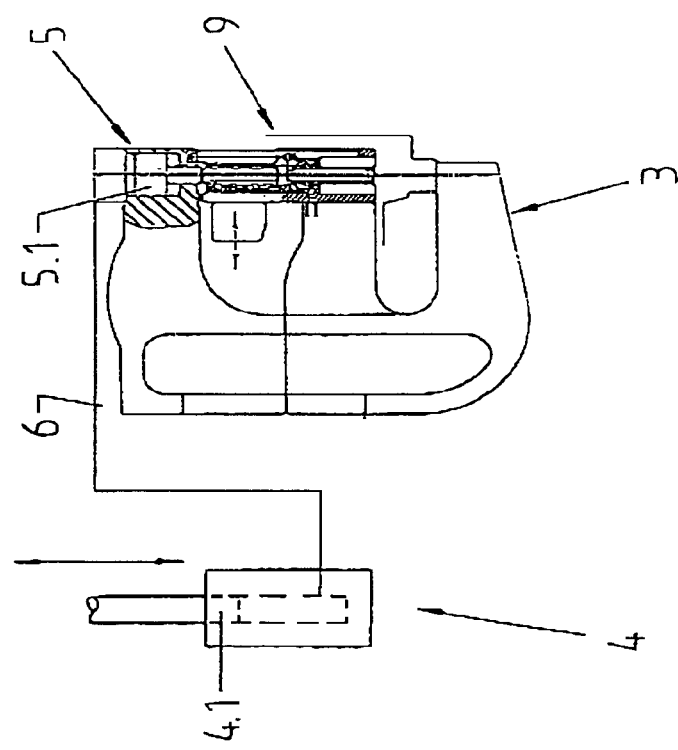
FIG. 1—the elements of a work station for inserting components, for example connecting elements, in a workpiece.

FIG. 2 shows the working cylinder 4 together with the working piston 4.1 there, which in this embodiment is moved by a motor, not depicted, by means of a threaded spindle 7.

The setting tong 3, which is fastened to a machine frame, or a holder, not shown, consists of a C-shaped tong frame 8, which with a leg or tong arm 8.1 forms a bearing or support surface 8.2 for the workpiece 2 during pressing of the respective nut 1. A punching head-shaped pressing tool 9 is fastened to the other leg or tong arm 8.3. This tool comprises e.g. an outer guide or an outer housing or tool 10 with an approximately cylindrical hollow body that is held with its upper end on the tong arm 8.3 and with its longitudinal axis defines the longitudinal tool axis WL and in which an inner tool part 11 is located with a cylindrical section 11.1 can be moved in the direction of the axis WL by a defined stroke. The section 11.1 of the inner tool part 11 forms a cylinder chamber 12 for the piston 13 of a plunger 14, which extends away in the direction of the axis WL on both sides of the piston 13, namely with an upper section 14.1 and a lower section 14.2. The lower section 14.2 of the plunger 14 is guided in a jointing channel 15, which is on the same axis with the axis WL in a lower section 11.2 with a reduced diameter of the tool part 11. The plunger 14 can be moved by a defined stroke, which corresponds approximately to the axial length of the cylinder chamber 12, in the tool part 11 in the direction of the axis WL. The upper end of the section 14.1 works together with the pressure piston 5.1, which likewise is located on the upper arm 8.3 of the frame 8 and which is controlled by the working piston 4.1 of the working cylinder 4.

Furthermore, in the depicted embodiment, there is a drive 16 working together between the upper tong arm 8.3 and the inner tool part 11, for example a hydraulic cylinder or other drive, which in the manner described below is used to move back the inner tool part 11 and also the plunger 14 into the starting position depicted in FIG. 3.

The section 11.1 of the inner tool part has a channel 17 extending radially to the axis WL in the vicinity of the crossover to the section 11.2 and ending in the jointing channel 15, namely at a pick-up position, in which the lower end 14.3 of the plunger 14 is located when the plunger 14 is moved completely upward. In the pick-up channel 17 in the depicted embodiment there is room for a nut 1.

The nuts 1 are advanced or fed to the setting tong 3 or to the tool 9 by a feed unit by means of a flexible hose 18 to an opening 19 in the outer tool part 10 forming a transfer position. The opening 19 is designed so that when the inner tool part 11 is moved completely upward in the outer tool part 10, the pick-up channel 17 is congruent with the opening 19.

Figure 3:
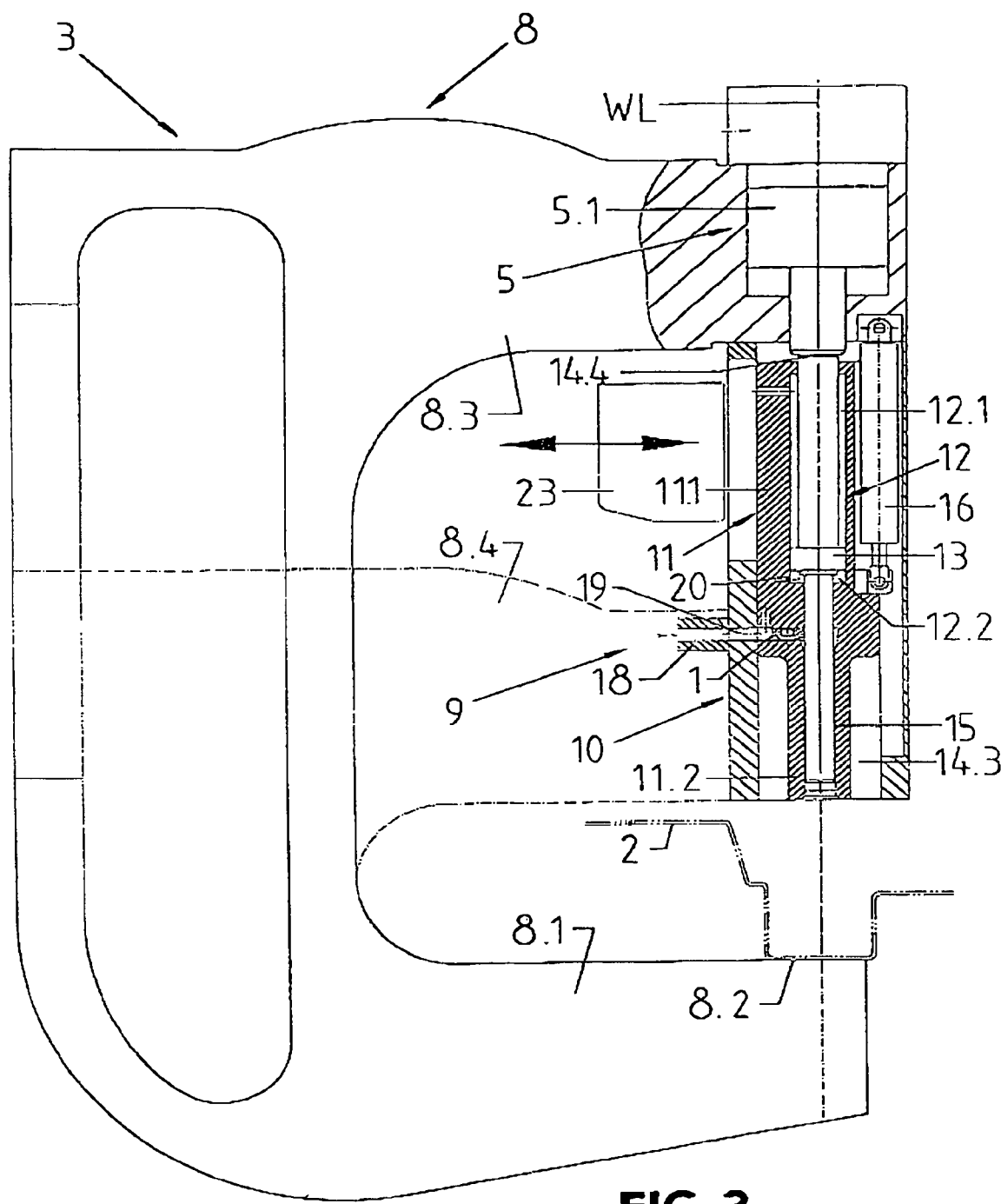
FIGS. 3-5 depict a processing or setting tong of the workstation in FIG. 1 in various states.
Figure 4:
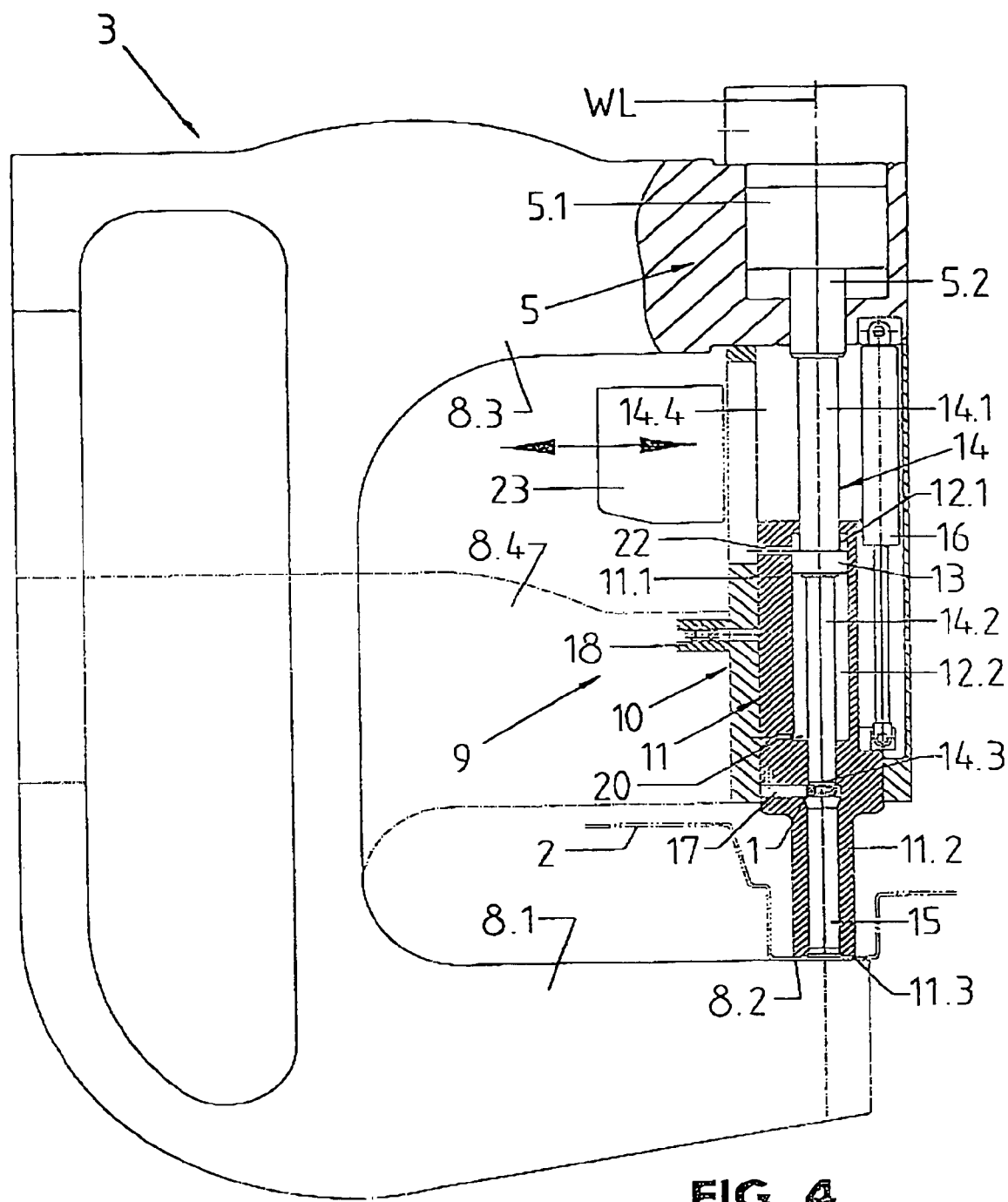

FIG. 3 shows the initial position of the tool 9. In this position, the inner tool part 11 is moved completely upward in the outer tool part 10. The pressure piston 5.1 is located in its upper starting position and the upper end of the plunger 14 bears against the pressure piston 5.1 and its piston rod or ram 5.2, so that the plunger 14 and its piston 13 are moved to the bottommost position within the cylinder chamber 12. From this starting position the inner tool part 11 is then moved downward within the outer tool part 10, with the plunger still supporting itself against the pressure piston 5.1. For this purpose, the sub-space or sub chamber 12.2 formed beneath the piston 13 is pressurized with a pressure medium, for example compressed air, by means of an inlet 20. The lower, free end of the section 11.2 then bears with an edge 11.3 surrounding the opening of the jointing channel 15 against the top side of the workpiece 2 facing away from the lower leg 8.1, namely in the area of an opening located there for inserting a nut 1. The lower end of the plunger 14 is located at the transfer position, i.e. where the pick-up channel 17 ends in the jointing channel 15. A nut 1 waiting in this pick-up channel 17 is moved by means of compressed air from the pick-up channel into the jointing channel 15, namely under the lower end of the plunger 14. By means of spring catches not depicted the nut 1 in this position depicted in FIG. 4 is held under the lower end of the plunger 14. Furthermore, the plunger 14 preferably has a permanent magnet on its lower end for holding the nut 1.

By pressurizing the upper sub-space or sub chamber 12.1 above the inlet 22 with a pressure medium, the plunger 14 is moved from the position in FIG. 4 downward, so that the nut 1 finally is inserted into the opening prepared in the workpiece 2 with a nut section used for connecting the nut with the workpiece 2. In this state, the upper end of the plunger 14 or the plunger section 14.1 is at a distance from the pressure piston 5.1 or its section 5.2 In the space between the lower end of the pressure piston 5.1 and the upper end of the plunger 14, a pressure transfer element 23 is then inserted radially from the side by means of a drive not depicted, so that in the state depicted in FIG. 5, the high pressing force required for pressing the nut 1 in the workpiece 2 can be transferred by actuating the working cylinder 4 by means of the pressure piston 5.1 and the pressure transfer element 23. Only a very small stroke is hereby necessary for the pressure piston 5.1 and the plunger 14.

After clinching and pressing the nut 1 in the workpiece, the pressure transfer element 23 is moved back to its starting position, in which this element is located outside of the movement space of the plunger 14 and of the inner tool part 11, so that the inner tool part 11 can then be moved back to its starting position depicted in FIG. 3 by means of the resetting element 16, in which position a new nut 1 can also be inserted into the pick-up channel 17 via the opening 19.

The work station described above features significant advantages:

First, the dimensions of the setting tong 3 can be kept very small due to the relocation of the working cylinder 4 and of the drive for the working piston 4.1. The closing movement of the inner tool part 11 and the advance of this tool part to the workpiece 2 is not effected by the pressure piston 5.1, but solely by pressurizing the cylinder sub-space 12.2 with the pressure medium.

The advance of the plunger 14 with the nut 1 located on this plunger to the workpiece 2 and therefore also the jointing of the nut 2 likewise are not effected by the pressure piston 5.1, but rather by pressurizing the cylinder sub-space 12.1 with the pressure medium.

Only the high pressure force required for pressing is produced by means of the pressure piston 5.1, namely by mean of the pressure transfer element 23. This results not only in a very short stroke for the pressure piston 5.1 and therefore very small dimensions for this pressure piston, but also provides for a significant safety aspect, i.e. both the movement of the inner tool part 11 and the movement of the plunger 14 can take place with a minimum force, therefore eliminating any danger of serious injury. Pressing with the full pressing force does not take place until the lower end of the inner tool part 11 bears fully against the workpiece, which means that the working gap is completely closed.

A further advantage consists in the fact that despite the small stroke for the pressure piston 5.1, there is a large clearance space beneath the pressing tool 9 in the starting position, so that the respective workpiece 2 can easily be placed in the tong 3.

Figure 5:
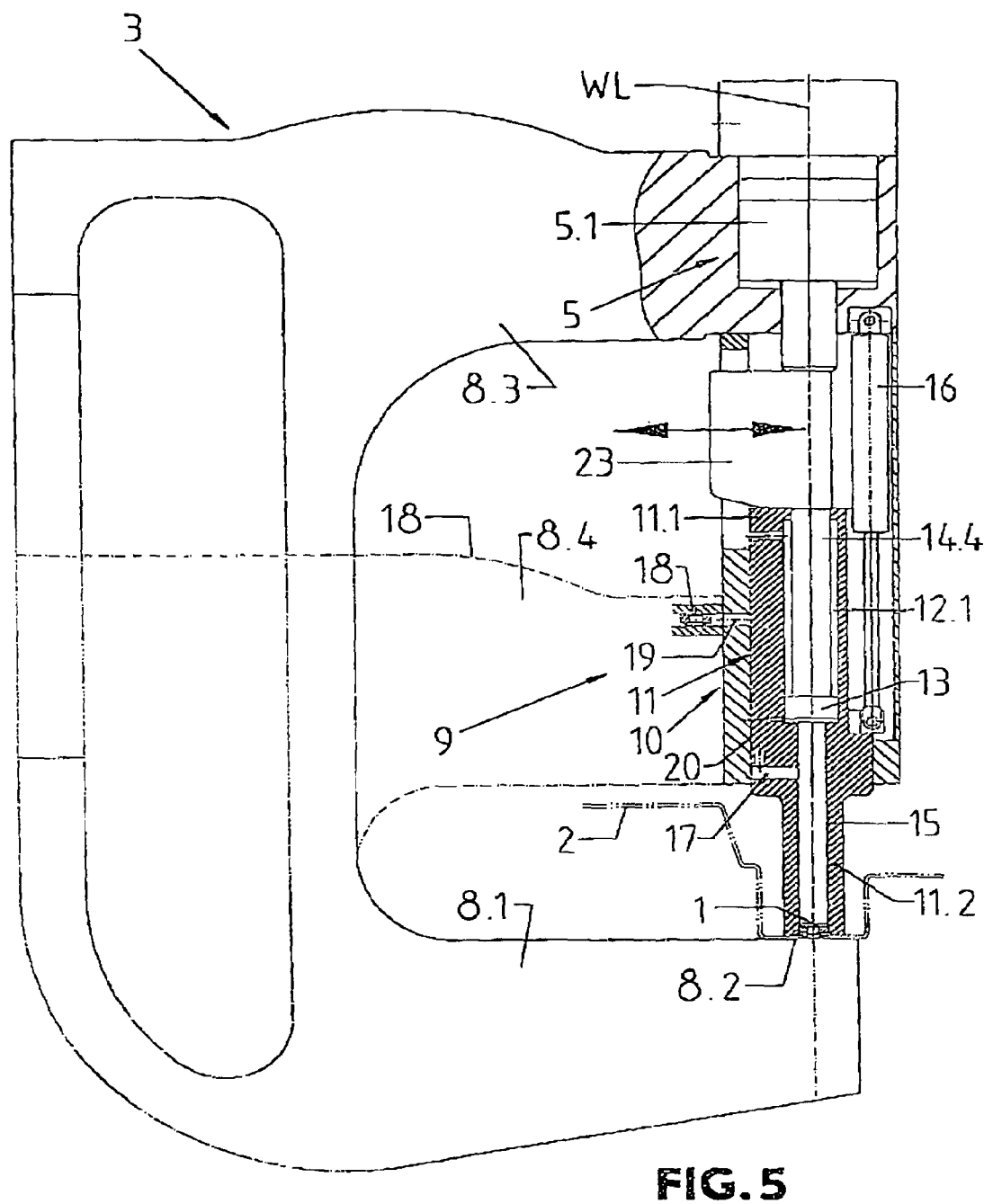

As indicated in FIGS. 3-5 with broken lines, the tong element 8 can also be designed with reduced dimensions, with the tong arm 8.4 replacing the tong arm 8.3, whereby then the tool 9 is held with the lower end of the outer tool part 10 on this tong arm of this reduced tong element.

FIGS. 6-9 show in depictions similar to FIGS. 3-5 as a further possible embodiment a setting tong 3a in various operating states. The setting tong 3a, which in place of the setting tong 3 in the work station depicted in FIG. 1 can be used for example together with a number of additional setting tongs 3a, consists likewise of a C-shaped tong frame 8 with the two legs or tong arms 8.1 and 8.3, which are connected with each other by means of the yoke section 8.4 with the C-shaped tong frame 8.

On the free end of the tong arm 8.1 or on the surface 8.2 there, a tool part 30, for example a die of a two-part tool is fastened. In the other tong arm 8.3 a die 31 can move axially guided. The die 31 is provided with a second tool part 32 of the two-part tool at its lower end extending into the space formed between the tong arms 8.1 and 8.2. The tool formed by the two tool parts 30 and 32 is used for example for connecting workpieces 33 and 34 made of a flat material, for example of sheet metal or sheet steel, by means of clinching (e.g. Tox clinching).

The die 31 is provided with a toothed rack 35, in the teeth of which a gearwheel 36 engages on the output shaft of a motorized auxiliary drive 37, which for example consists of a motor actuated with compressed air and which is located on the tong arm 8.3. By means of the auxiliary drive 37 the die 31 with its tool part 32 can be moved in the direction of a longitudinal tool axis WL connecting the two tong arms 8.1 and 8.3 by a stroke H, and between a starting position in which the two tool parts 30 and 32 are the greatest distance from each other and a working position in which the tool part 32 bears against the workpieces 33 and 34 supporting themselves on the tool part 30.

On the top side of the tong arm 8.3 facing away from the tong arm 8.1 there is a massive guide 38 with slides 39 on which a pressure cylinder 40, corresponding to the pressure cylinder 5, with a pressure piston and a piston rod 40.1 is located. The pressure cylinder 40 is oriented with its axis parallel to the axis WL. The free end of the piston rod 40.1 with a pressure element 41 with an enlarged diameter located there extends beyond the side of the pressure cylinder 40 facing the tong arm 8.3. By means of an actuating drive 42, which for example is at least one pneumatic cylinder, the slide 39 can move together with the pressure cylinder 40 between the starting position depicted in FIG. 6 and the working position of the pressure cylinder 40 depicted in FIGS. 7 and 8, namely radially to the axis WL.

In the starting position the pressure cylinder 40 is in non-activated condition to the side of the axis WL and to the side of the movement space of the ram 32. In the working position the pressure cylinder 40 is then on the same axis as the axis WL, and the pressure element 41, with the pressure cylinder 40 not yet activated but in the working position, is outside of a recess 43 formed in the tong arm 8.3, but directly at the opening of this recess. When the pressure cylinder 40 is activated and in the working position, the pressure element 41 extends into the recess 43.

The mode of operation of the setting tong 3a, which can be fastened with a mount 44 located on the tong frame 8 to a device or machine stand or frame, can be described as follows:

The setting tong 3a is in an initial state, in which the pressure cylinder 40 is in its starting position and the die 31 is moved by the auxiliary drive 37 so that the tool parts 30 and 32 are at the greatest distance from each other (FIG. 6). In this state, for example, the workpieces 33 and 34 are placed in the working gap of the open tool formed between the tool parts 30 and 32. Since the distance between the tool parts 30 and 32 is relatively large, the elbowed workpiece 33 can easily be inserted from the side into the working gap, or with fixed workpieces 33 and 34, the setting tong can easily be moved or advanced over the workpieces 33 and 34.

In a subsequent step, the die 31 is moved axially by means of the auxiliary drive 37 so that the tool part 32 comes to bear against the workpiece 33 above and bears with a certain force against it so that both workpieces 33 and 34 are clamped between the tool parts 30 and 32 (FIG. 7). In this embodiment also the closing force for the die 31 and the tool part 32 can be kept relatively low, so that the danger of injury is eliminated.

During the closing movement of the die 31 the upper end 31.1 of this die that enlarges to a head plunges into the recess 43, so that after completion of the closing movement, i.e. when the tool part 32 bears against the workpiece 33, the die is guided on its upper end 3.1 as well and the front side of the head 31.1 facing away from the die 31 is in a plane perpendicular to the axis WL, offset to the tong arm 3.1, i.e. in the depiction selected for FIGS. 6-8, slightly below the plane in which the bottom side or the free end of the pressure element 41 is located.

After completion of the closing movement of the die 31, the slide 39 with the pressure cylinder 40 is moved by means of the actuating drive 42 into the working position, in which then the axis of the pressure cylinder 40 is on the same axis with the axis WL and the bottom side of the pressure element facing away from the pressure cylinder 40 is directly adjacent to the head element 3.1 (FIG. 8).

Activating the pressure cylinder causes the pressure element 41 entering the recess 43 to bear against the end 31.1, so that the die 31 and the tool part 32 located on the die moves toward the tool 30 with a high force, but with an extremely short stroke in comparison with the stroke H, namely for the work to be performed, for example connecting of the two workpieces 33 and 34 through clinching (FIG. 9).

After completion of the work cycle and deactivation of the pressure cylinder 40, the latter is first moved back with the slide 39 into its starting position. Afterwards, the die 31 is also moved by means of the auxiliary drive 37 to its starting position, in which it protrudes with its upper end forming the head piece 31.1 in the depicted embodiment beyond the top side of the tong arm 8.3 facing away from the tong arm 8.1.

The lifting cylinder 40 in this embodiment is for example likewise controlled by the working cylinder 4 or a suitable hydraulic component.

The setting tong 3a also features the advantage that only a very small working stroke is necessary for the pressure cylinder 40 and therefore only a small volume of hydraulic fluid is required or must be displaced for this working stroke, while the much larger closing movement or the opening and closing of the tool is effected by means of the auxiliary drive. This advantage is of special significance when a number of setting tongs 3a is provided for on one apparatus and these setting tongs must be actuated together.

The setting tong 3a features the further advantage that a large closing stroke H can easily be achieved, so that the tool consisting of the two tool parts 30 and 32 or a tool consisting of other tool parts can be opened very wide, so that even with a small and compact design of the setting tong 3a, for example complex-formed workpieces, e.g. workpieces with bends, can easily be inserted into the opened tool or removed from the opened tool.

The special advantage of the setting tong 3a as opposed to the setting tong 3 consists in the fact that when the pressure cylinder 40 is in the starting position, this pressure cylinder and the die 31 are not on the same axis, but rather offset axially, so that the large stroke H for the closing movement is possible without restriction by the pressure cylinder 40. Furthermore, the setting tong 3a by-passes the pressure transfer element 23, which especially with a large closing stroke in the direction of the axis WL must have a large dimension corresponding to this closing stroke and therefore considerably affects the size of the setting tong 3. By by-passing this pressure transfer element 23, the setting tong 3a can be designed with reduced dimensions.

The invention was described above based on sample embodiments. It goes without saying that numerous modifications and variations are possible without abandoning the underlying inventive idea of the invention. It is possible, for example, to drive the working piston 4.1 in another manner, for example pneumatically.

It was assumed above that the respective actuating element is a hydraulic pressure cylinder 5 or 40. Generally, however, other drives can be used as actuating elements, in particular such drives with which sufficiently high pressure forces can be produced, for example a toggle joint drive 45, as depicted very schematically in FIG. 10. This drive is located on the slide 39 instead of the pressure cylinder 40 and has a ram 45.1 corresponding to the piston rod 40.1 which can move axially guided in a housing 46 of the drive 45 and which then, in a corresponding working position with the die advanced in FIG. 9 exerts a high pressure force on this die, namely in the same manner as described above for the pressure cylinder 40. The toggle joint drive 45 is actuated by means of an actuator, which is for example a pneumatic cylinder, an electric motor, etc.

Furthermore, it is also possible to use an electric drive or a pneumatic drive as the actuating element, with which a suitably high pressure force can be exerted on the press ram 14 or the die 31.

With the invention it is also possible to design the drive comprising the actuating element as a modular unit, i.e. so that it can be replaced at the respective setting tong 3 or 3a, so that corresponding to the respective use as an actuating element, for example, optionally the pressure cylinder 5 or 40, the toggle joint drive 45, etc. can be used.

Further advantages of the invention are significant energy savings and faster work processes, since the closing movement can take place at a relatively high speed and using low power. Furthermore, the embodiment according to the invention results in reduced wear. The modular design of the drive and the actuating element enable optimum adaptation to the individual requirements.

| Reference number list | |
|---|---|
| 1 | nut |
| 2 | workpiece |
| 3 | setting tong |
| 4 | working cylinder |
| 4.1 | working piston |
| 5 | pressure cylinder |
| 5.1 | pressure piston |
| 6 | pressure line |
| 7 | threaded spindle |
| 8 | tong frame |
| 8.1, 8.3, 8.4 | leg or tong arm |
| 8.2 | bearing surface |
| 9 | tool |
| 10 | outer tool element |
| 11 | inner tool element |
| 11.1, 11.2 | section |
| 11.3 | ring surface |
| 12 | cylinder space or chamber |
| 12.1, 12.2 | sub space or sub chamber |
| 13 | piston |
| 14 | press ram |
| 14.1, 14.2 | section |
| 14.3, 14.4 | ram end |
| 15 | jointing channel |
| 16 | actuating cylinder |
| 17 | channel |
| 18 | hose |
| 19 | load opening |
| 20 | inlet |
| 22 | inlet |
| 23 | pressure transfer element |
| 30 | tool element |
| 31 | die |
| 32 | tool element |
| 33, 34 | workpiece |
| 35 | toothed rack |
| 36 | gearwheel or pinion |
| 37 | auxiliary drive |
| 38 | slide guide |
| 39 | slide |
| 40 | pressure cylinder |
| 40.1 | piston rod of pressure cylinder |
| 41 | thrust member |
| 42 | actuating drive |
| 43 | recess |
| 44 | mount |
| H | closing stroke |
| WL | tool axis |

What is claimed is:

1. A hydraulic processing tong for processing workpieces comprising
a first reciprocating tool part on a first tong arm, the first tool part configured to be advanced in relation to an opposing second tool part in a tool part axis for closing a work area or work gap,
a hydraulic actuating element for applying a force exerting to the first tool part or an element of the first tool part in the tool part axis,
a closing drive advancing the first tool part and
means for coupling the first tool part after advancing to the hydraulic actuating element, wherein the actuating element is adapted to move between a starting position, in which the actuating element is offset from the axis of a die and a working position, in which the actuating element is aligned with the axis of the die.

2. The processing tong as claimed in claim 1, wherein the first tool part or the element of the first tool part is an axially movable press ram or plunger, which with a first end or a tool fixed there and an opposing workpiece assembly form the working gap and with the first end can moved toward and away from the workpiece assembly, and that the hydraulic actuating device for the working stroke can be connected by a driven linkage with the plunger or ram.

3. The processing tong as claimed in claim 2, wherein the workpiece assembly is formed by a second tool part.

4. The processing tong as claimed in claim 2, wherein the drive surface of the ram is formed by a second end of the ram facing away from the first end.

5. The processing tong as claimed claim 2, wherein the ram can be moved axially, with its first end or with a ram section possessing this end, in a jointing channel formed in the first tool part.

6. The processing tong as claimed in claim 5, wherein the piston-cylinder unit consists of a piston located on the ram the piston can be moved axially in a cylinder chamber formed in the first tool part.

7. The processing tong as claimed in claim 1, wherein at least one pressure transfer element is provided for, which when the press ram is advanced, produces a force-transferring connection between the actuating element of the hydraulic actuating device and a drive surface of the ram which (surface) is at an axial distance from this actuating element.

8. The processing tong as claimed in claim 1, with the closing drive also the first tool part can be moved axially between a starting position and the working position and for this purpose can move axially in an outer second tool part.

9. The processing tong as claimed in claim 1, wherein a pressure transfer element or coupling can be moved between a starting position, in which the pressure transfer element is located outside of the movement space of the ram and/or of the first tool part and a working position, in which the pressure transfer element is located between the drive surface of the ram and the actuating element.

10. The processing tong as claimed in claim 9, wherein the pressure transfer element can be moved radially to the axis of the ram between the starting position and the working position.

11. The processing tong as claimed in claim 1, wherein the actuating element is a hydraulic actuating element.

12. The processing tong as claimed in claim 11, the pressure piston is part of a slave cylinder actuated by a working cylinder or a working piston located there and that the working cylinder is spatially separated from the tool or the processing tong.

13. The processing tong as claimed in claim 1, wherein the actuating element is a pressure piston of a hydraulic cylinder.

14. The processing tong as claimed in claim 1, wherein the first tool part forms a ring-shaped support or hold-down surface enclosing one opening of the jointing channel.

15. The processing tong as claimed in claim 14, wherein the piston-cylinder unit is a pneumatic piston-cylinder unit.

16. The processing tong as claimed in claim 14 wherein the piston-cylinder unit is a double-acting unit.

17. The processing tong as claimed in claim 14, wherein the further drive element is a cylinder, or a linkage.

18. The processing tong as claimed in claim 1, wherein a closing drive has a piston-cylinder unit between the ram and the first tool part.

19. The processing tong as claimed in claim 1, wherein a closing drive has a further drive element working between the first tool part and the second tool part or a holder.

20. The processing tong as claimed in claim 1, wherein a force transfer element or coupling element is a block that can be inserted in a space between the hydraulic actuating device or its actuating element and the drive surface.

21. The processing tong as claimed in claim 1, wherein the piston of the working cylinder can be actuated by means of a motorized drive, or by means of a motor-driven spindle.

22. The processing tong as claimed in claim 1, wherein the piston of the working cylinder is actuated pneumatically.

23. The processing tong as claimed in claim 22, wherein the actuating element is moved radially to the axis of a ram or radially to the axis of a closing movement between the starting position and the working position.

24. The processing tong as claimed in claim 1, wherein the actuating element is moved in a guide or on a tong arm.

25. The processing tong as claimed in claim 24, wherein the auxiliary drive is linked by means of a gearwheel drive with a press ram or the die.

26. The processing tong as claimed in claim 1, wherein the first tool part is moved axially by means of an auxiliary drive for the closing movement.

27. The processing tong as claimed claim 1, wherein the actuating element is an electric motor-driven or pneumatic drive.

28. The processing tong as claimed in claim 1, wherein the actuating element is a toggle joint drive.

29. The processing tong as claimed in claim 1, wherein the first tool part comprises a plunger or a ram.

* * * * *